United States Patent [19]
Saiki et al.

[11] Patent Number: 5,814,696
[45] Date of Patent: Sep. 29, 1998

[54] POLYESTER RESIN COMPOSITION AND A RELAY COMPONENT FORMED THEREOF

[75] Inventors: Noritsugu Saiki; Katsuhiko Hironaka; Hodaka Yokomizo, all of Chiba, Japan

[73] Assignee: Teijin Limited, Osaka, Japan

[21] Appl. No.: 701,550

[22] Filed: Aug. 22, 1996

Related U.S. Application Data

[63] Continuation of Ser. No. 385,596, Feb. 8, 1995, abandoned.

[30] Foreign Application Priority Data

| Feb. 10, 1994 | [JP] | Japan | 6-016185 |
| Feb. 22, 1994 | [JP] | Japan | 6-024222 |
| Jun. 16, 1994 | [JP] | Japan | 6-134102 |

[51] Int. Cl.$^6$ .................................................. C08L 67/02
[52] U.S. Cl. ........................ 524/412; 524/409; 524/539; 525/444
[58] Field of Search ........................... 525/444; 524/539, 524/409, 412

[56] References Cited

U.S. PATENT DOCUMENTS 5,086,104  2/1992  Wada et al. .

FOREIGN PATENT DOCUMENTS

| 0544032 | 6/1993 | European Pat. Off. . |
| 2374394 | 7/1978 | France . |
| 60-055055 | 3/1985 | Japan . |
| 3263457 | 11/1991 | Japan . |
| C3263457 | 11/1991 | Japan . |
| A06157884 | 6/1994 | Japan . |
| B2011437 | 7/1979 | United Kingdom . |
| A1569230 | 6/1980 | United Kingdom . |
| 8000255 | 2/1980 | WIPO . |
| WOA8000255 | 2/1980 | WIPO . |

OTHER PUBLICATIONS

Chemical Abstracts, vol. 121, No. 20, Nov. 14, 1994, Col., OH, US; abstract No. 232869, & JP-A-06 157 884 (Teijin Ltd.) Jun. 7, 1994—abstract.

Chemical Abstracts, vol. 122, No. 18, May 1, 1995, Col. OH, US; abstract No. 215978, & JP—06 240 018 (Teijin Ltd.) Aug. 30, 1994—abstract.

Database WPI, Wk. 9408, Derwent Pub. Ltd., London, GB; AN 94–062144 & JP-A-06 016 913, (Nippon Steel Corp. et al.), Jan. 25, 1994—abstract.

Database WPI, Wk. 8538, Derwent Pub. Ltd., London, GB; AN 85–232833 & JP-A-60 150 526 (Mitsui Toatsu Chem., Inc.) Aug. 8, 1985—abstract.

Database WPI, Wk. 9202, Derwent Pub. Ltd., London, GB; AN 92–013054 & JP-A-03 263 457 (Polyplastics KK), Nov. 22, 1991—abstract.

*Primary Examiner*—Patricia A. Short
*Attorney, Agent, or Firm*—Sherman and Shalloway

[57] ABSTRACT

A polyester resin composition comprising (A) an aromatic polyester resin and (B) a polyester block copolymer resin which consists essentially of (a) a polyester soft block comprising an aromatic dicarboxylic acid component and a glycol component having 5 or more carbon atoms as main constituents and having a melting point of about 100° C. or less or being amorphous and (b) a polyester hard block having a melting point of about 150° C. or more. A relay component formed of the above polyester resin composition has excellent vibration-damping and noise suppression properties.

19 Claims, 2 Drawing Sheets

POLYESTER RESIN COMPOSITION AND A RELAY COMPONENT FORMED THEREOF

This application is a continuation, of application Ser. No. 08/385,596, filed Feb. 8, 1995, now abandoned.

BACKGROUND OF THE INVENTION

(1) Field of the Invention

This invention relates to a polyester resin composition and a relay component formed thereof. More specifically, the present invention relates to a polyester resin composition having excellent vibration-damping and noise suppression properties and rigidity, and to a relay component formed thereof, having excellent vibration-damping and noise suppression properties.

(2) Description of the Prior Art

In recent years, there have been made available a lot of electric products containing moving parts such as small-sized motors and relays with the development of home electric appliances and the like. As a result, a problem of noise generated from these electric products in the living space has become up to the surface. To cope with this problem, especially for the purpose of reducing noise generated from the relays, the development of technology for providing relays with a noise reduction function is desired. As a method for reducing such noise, various approaches are being considered such as one for changing the structure of a relay and one for modifying the physical properties of resin components constituting a relay. Particularly, the latter for modifying the physical properties of resin components is strongly desired as a simple method. For this purpose, a thermoplastic resin has been blended with a filler having a high specific gravity to increase the specific gravity of the resin in order to improve its sound suppression effect.

On the other hand, resins composed of a single polymer having excellent vibration-damping property are inferior in rigidity and, hence, cannot be used as a structural material.

In other words, when rubber having excellent vibration-damping property is used in a relay case, vibration decreases and noise generated also reduces. However, most of conventionally developed materials having satisfactory vibration-damping effect are defective in that their flexural modulus is 1,500 MPa or less and they are not rigid enough to be used alone as a resin part constituting a relay. In case where a resin constitutes a structural part alone without compounding with another material, generally, a flexural modulus of at least 1,500 MPa is generally required.

Therefore, a technique for blending a resin having high rigidity with an elastomer having high tan δ and excellent vibration-damping property is adopted. However, to improve the vibration-damping property of a resin composition comprising two different components, the elastomer having high tan δ has to be blended in a volume ratio of at least 50%. As the result, the resin composition suffers from a sharp reduction in rigidity and cannot be used alone as a structural material. In addition, the production and processing of the resin composition are difficult, which leads to boosted costs, and, hence, a resin composition which can be practically and widely used has been yet to be developed.

JP-A-53-81560 (the term "JP-A" as used herein means an "unexamined published Japanese patent application") discloses a flame retardant composition which comprises a flame retardant and a thermoplastic copolyester which essentially consists of (a) terminal reactive poly(1,4-butylene terephthalate) block and (b) (i) terminal reactive aromatic/aliphatic copolyester block or (ii) a terminal reactive aliphatic polyester block.

JP-A-54-94554 discloses a molding composition which comprises (a) a thermoplastic resin selected from high molecular weight linear polyester and block copolyester, (b) a flame retardant and (c) about 0.05 to 10% by weight of an olefin polymer or copolymer based on the total weight of all components.

The high molecular weight block copolyester described above is identical to the thermoplastic copolyester disclosed in JP-A-53-81560 above.

JP-A-3-263454 discloses a vibration-damping polyester composition which comprises 100 parts by weight of a resin component which consists of (A) 60 to 97 parts by weight of a crystalline thermoplastic polyester resin and (B) 40 to 3 parts by weight of a polyester elastomer and (C) 5 to 200 parts by weight of a glass fiber having elliptical sectional shape with a long diameter/short diameter (in cross section) ratio of 1.5 to 5.

The above-described polyester elastomer is a copolymer which comprises a polyester hard segment and a polyether soft segment having a number average molecular weight of about 200 to 6,000.

Therefore, the above-described composition undergoes a sharp reduction in rigidity due to inclusion of the elastomer and can not have large vibration-damping effect because of the difficulty of increasing the amount of the elastomer to be added in practical use.

SUMMARY OF THE INVENTION

It is therefore an object of the invention to provide a novel polyester resin composition excellent in vibration-damping and noise suppression properties and rigidity.

Another object of the invention is to provide a polyester resin composition which can be injection molded and thermally molded, exhibits vibration-damping property at a wide temperature range, and has rigidity enough to constitute a structural part such as a relay case and the like.

Still another object of the invention is to provide a relay component formed of the polyester resin composition of the invention and being excellent in vibration-damping and noise suppression properties.

Other objects and advantages of the invention will become apparent from the following description.

DESCRIPTION OF THE PREFERRED EMBODIMENTS

Figure 1:
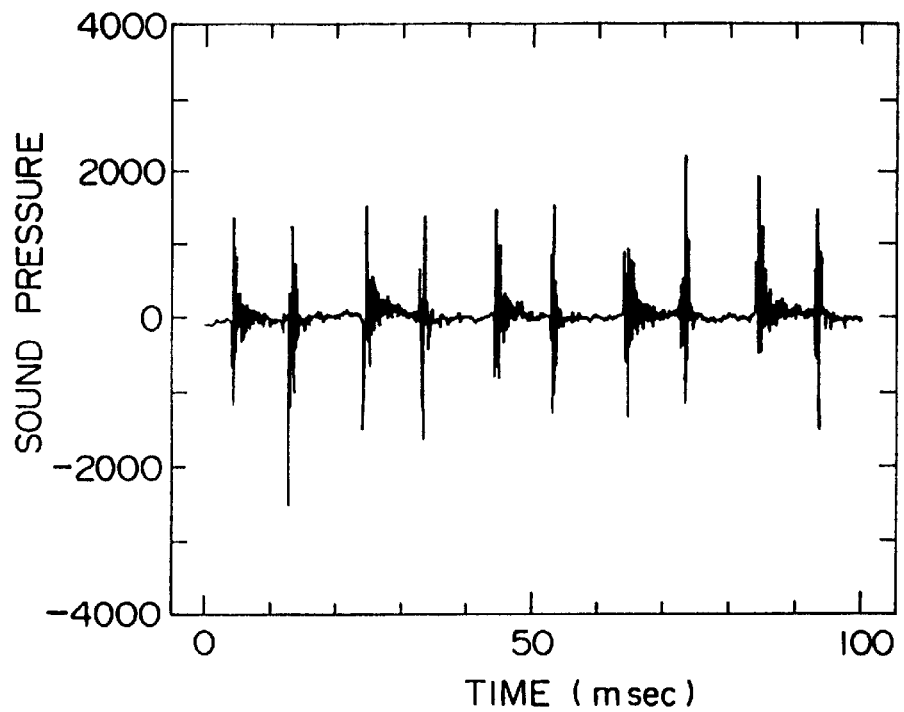
FIG. 1 is a graphic illustration of the waveform of generated sound recorded to evaluate the noise suppression property of a relay case of Example 1.

According to the present invention, the above objects and advantages can be attained by a polyester resin composition which comprises (A) an aromatic polyester resin and (B) a polyester block copolymer resin which consists essentially of (a) a polyester soft block composed of an aromatic dicarboxylic acid component and a glycol component having 5 or more carbon atoms as main components and having a melting point of about 100° C. or less or being amorphous and (b) a polyester hard block having a melting point of about 150° C. or more, the aromatic polyester resin (A) occupying 1 to 99% by weight based on the total weight of the aromatic polyester resin (A) and the polyester block copolymer resin (B).

The above-described polyester resin composition provided by the present invention is based on the following fact discovered through researches conducted by the inventors of the present invention.

In other words, researches into the mechanism of noise generated from a relay case, conducted by the inventors of the present invention, revealed that vibration generated from relay moving electrodes vibrates a relay base and a relay case, i.e., the relay case itself is a source of noise.

Then, the inventors found that it is possible to suppress noise generated from a relay case by using a material having a high loss tangent (tan δ) as a material for the relay case and that the above-described polyester resin composition is extremely effective as such a material.

The term "relay component" as used herein refers to components constituting a relay such as a relay contact, a base for fixing electromagnetic coils and holding a substrate terminal, a card for transmitting dynamic force generated from the electromagnetic coils to a moving contact, a case for housing an entire relay or the like.

The polyester resin composition of the present invention contains the aromatic polyester resin (A) and the polyester block copolymer resin (B), as described above.

The aromatic polyester resin (A) is composed of an aromatic dicarboxylic acid component and an aliphatic diol component. Illustrative examples of the aromatic dicarboxylic acid include benzenedicarboxylic acid such as terephthalic acid, isophthalic acid and phthalic acid; naphthalenedicarboxylic acid such as 2,6-naphthalenedicarboxylic acid and 2,7-naphthalenedicarboxylic acid; 4,4'-diphenyldicarboxylic acid; and the like. Among these, the preferred are benzenedicarboxylic acid, naphthalenedicarboxylic acid and 4,4'-diphenyldicarboxylic acid.

Illustrative examples of the aliphatic diol include straight-chain aliphatic diol having 2 to 12 carbon atoms, diethylene glycol, cyclohexanedimethanol and the like. Specific examples of the strain-chain aliphatic diol include ethylene glycol, trimethyl glycol, tetramethylene glycol, hexamethylene glycol, decamethylene glycol, dodecamethylene glycol and the like. Among these, the preferred are straight-chain aliphatic diol having 2 to 4 carbon atoms and cyclohexanedimethanol.

Preferred examples of the aromatic polyester resin (A) are composed of at least one aliphatic diol selected from the group consisting of aliphatic glycol having 2 to 4 carbon atoms and cyclohexanedimethanol, as the diol component and at least one aromatic dicarboxylic acid selected from the group consisting of benzenedicarboxylic acid and naphthalenedicarboxylic acid, as the dicarboxylic acid component. Among them, particularly preferred as the aromatic polyester resin (A) are polyalkylene terephthalate such as polybutylene terephthalate and polybutylene naphthalene dicarboxylate such as polybutylene 2,6-naphthalene dicarboxylate.

The aromatic polyester resin (A) preferably has a flexural modulus of at least 1,000 MPa, more preferably at least 1,500 MPa. Further, the aromatic polyester resin (A) preferably has an intrinsic viscosity of 0.5 or more, more preferably 0.7 to 1.5.

The polyester block copolymer resin (B) is composed of a soft block and a hard block.

The soft block comprises aromatic dicarboxylic acid and glycol having 5 or more carbon atoms as main constituents.

Preferred examples of the aromatic dicarboxylic acid include a benzenedicarboxylic acid and a naphthalenedicarboxylic acid.

Illustrative examples of the benzenedicarboxylic acid include terephthalic acid, isophthalic acid, phthalic acid, 2,6-naphthalenedicarboxylic acid and 2,7-naphthalenedicarboxylic acid. Illustrative examples of the naphthalenedicarboxylic acid include 2,6-naphthalenedicarboxylic acid and 2,7-naphthalenedicarboxylic acid.

The soft block may contain an aliphatic dicarboxylic acid as a subsidiary dicarboxylic acid component. Specific examples of the aliphatic dicarboxylic acid include succinic acid, adipic acid, sebacic acid, azelaic acid, decane dicarboxylic acid, cyclohexane dicarboxylic acid and the like.

The proportion of the aromatic dicarboxylic acid constituting the soft block is preferably at least 60 mol % of all the dicarboxylic acids, and accordingly, the proportion of the aliphatic dicarboxylic acid is preferably no more than 40 mol % of all the dicarboxylic acids.

Particularly, an aromatic dicarboxylic acid which contains a non-linear aromatic dicarboxylic acid such as phthalic acid, isophthalic acid or 2,7-naphthalene dicarboxylate or a rotationally unsymmetrical aromatic dicarboxylic acid in an amount of at least 60 mol % of all the aromatic dicarboxylic acids is preferably used as the aromatic dicarboxylic acid so that the soft block has an amorphous structure or a low-crystalline melting point.

As the glycol having 5 or more carbon atoms constituting the soft block, aliphatic glycol having 5 to 12 carbon atoms is preferably used.

The glycol having 5 or more carbon atoms is preferably selected from the group consisting of hexamethylene glycol, decamethylene glycol, 3-methylpentamethylene glycol and 2-methyloctamethylene glycol. They may be used alone or in combination of two or more.

The soft block may contain an aliphatic diol having 2 to 4 carbon atoms as a subsidiary diol component. The proportion of the auxiliary diol component is preferably no more than 40 mol % of all the diol components.

The polyester constituting the soft block has a melting point of about 100° C. or less, or is amorphous. When the melting point is above 100° C., only a block copolymer which provides a polyester resin composition having poor vibration-damping and noise suppression properties is obtained. The polyester constituting the soft block preferably has a melting point of 50° C. or less, or is amorphous.

The polyester constituting the hard block of the polyester block copolymer resin (B) has a melting point of about 150° C. or more. Preferred examples of the polyester are the same as those provided above for the aromatic polyester (A).

Particularly preferred is aromatic polyester in which the diol component is at least one aliphatic diol selected from the group consisting of aliphatic glycol having 2 to 4 carbon atoms and cyclohexanedimethanol and the dicarboxylic acid component is at least one aromatic dicarboxylic acid selected from the group consisting of benzenedicarboxylic acid and naphthalenedicarboxylic acid.

The weight ratio of the soft block to the hard block is preferably from 30/70 to 80/20. As a general tendency, when the proportion of the hard block increases, the mechanical strength of the resulting block copolymer improves, while the dynamic loss tangent decreases. The above ratio is more preferably from 50/50 to 80/20.

The block copolymer (B) preferably has the maximum value of dynamic loss tangent at a temperature between −20° C. and +40° C. Particularly, to provide a polyester resin composition having excellent vibration-damping and noise suppression properties at a temperature near room temperature, it is preferred to use a block copolymer having the maximum value of mechanical loss tangent at a temperature between −15° C. and 20° C.

The maximum value of mechanical loss tangent is preferably at least 0.05.

The block copolymer (B) can be produced, for example, by allowing polyester corresponding to the hard block and polyester corresponding to the soft block to react each other under a molten state to achieve a melting point lower than the melting point of the polyester corresponding to the hard block by 2° to 40° C.

The block copolymer (B) preferably has an intrinsic viscosity of at least 0.5, more preferably at least 0.8, when measured at 35° C. in o-chlorophenol.

Preferably, the polyester resin composition of the present invention contains aromatic polyester (A) in an amount of 1 to 99 parts by weight based on the total weight of the aromatic polyester (A) and the polyester block copolymer (B). More preferably, the resin composition contains aromatic polyester (A) in an amount of 20 to 90 parts by weight based on the same standard.

The polyester resin composition of the present invention may further contain at least one of a reinforcing filler and a brominated flame retardant.

The reinforcing filler is preferably fibrous or flaky, and both fibrous and flaky reinforcing fillers may be combined to further increase reinforcing effect and further reduce anisotropy.

Preferred examples of the fibrous filler include glass fiber, carbon fiber, graphite fiber, aramid fiber, ceramic fiber, metal fiber, potassium titanate whisker and boron whisker. The fibrous filler preferably has an aspect ratio of 10 to 100 and a length of 1 mm or less.

The fibrous reinforcement may be treated with a binding agent (such as polyvinyl acetate and polyester), a coupling agent (such as a silane compound, borone compound and titanium compound) or other surface treating agents.

Preferred examples of the flaky filler include mica, glass flake and metal foil. The flaky filler preferably has an aspect ratio of at least 30 and an average particle diameter of 100 to 1,000 μm.

The reinforcing filler is preferably used in an amount of 0.1 to 100 parts by weight, more preferably 30 to 80, based on 100 parts by weight of the total of the aromatic polyester resin (A) and the polyester block copolymer resin (B).

Typical examples of the brominated flame retardant include brominated bisphenol A epoxy resin and modified products thereof having part or all of the terminal glycidyl group endcapped, brominated acrylic resin, brominated polystyrene, brominated polyphenylene ether, polycarbonate oligomers produced from brominated bisphenol A as source material, brominated biphenyl ether, brominated diphthalimide compound and the like.

Among these, the preferred are brominated oligomer polymer flame retardants which are difficultly dissolved, volatilized and sublimated, does not promote a reduction in the molecular weights of the aromatic polyester (A) and the block copolymer (B), generate few residues of a solvent used in the production process and unreacted products, and hardly eliminate decomposition products, bromine compounds and an endcapping agent at the time of molding.

Moreover, flowability is also an important factor of the resin composition for application in thin molded articles such as relays and the like, and resin compositions having low viscosity and free of thickening are preferred for such application. Preferred resin compositions which satisfy these requirements described above are brominated bisphenol A epoxy resin and brominated acrylic resin. Particularly suitable is brominated acrylic resin which shows good flowability and rarely eliminates bromides.

The brominated bisphenol A epoxy resin is represented by the following general formula (I):

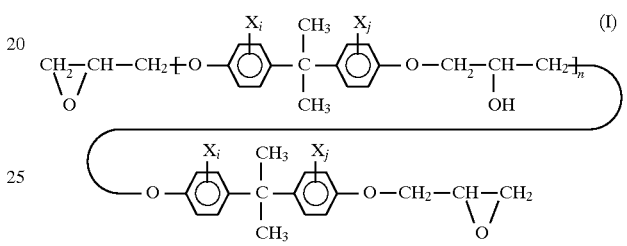

wherein X is a bromine atom, i an j are each an integer of 1 to 4, and n is an average polymerization degree of 0 to 40.

Among these, the preferred are the one contains bromine in an amount of at least 20% by weight.

As the brominated bisphenol A epoxy resin represented by the above formula (I), an epoxy resin may be used which is prepared by mixing brominated bisphenol A with brominated bisphenol A diglycidyl ether which is obtained by reacting brominated bisphenol A with epichlorohydrin so that the hydroxyl group of the brominated bisphenol A has 0 to 0.96 equivalent based on 1 equivalent of the epoxy group of the brominated bisphenol A diglycidyl ether and by heating the resulting mixture to cause a reaction at 100° to 250° C. in the presence of a basic catalyst (such as sodium hydroxide, lithium hydroxide and tributyl amine). Among them, particularly preferred is an epoxy resin having an average polymerization degree n of 10 to 30 from a view point of good balance between flowability and mechanical properties.

Specific examples of the modified brominated bisphenol A epoxy resin having part or all of its terminal glycidyl group endcapped include modified epoxy resins represented by the above formula (I) having part or all of their terminal glycidyl groups endcapped with a carboxylic acid, alcohol, phenol, amine or the like.

Illustrative examples of the brominated acrylic resin include homopolymers or copolymers of brominated benzyl (meth)acrylate represented by the following general formula (II):

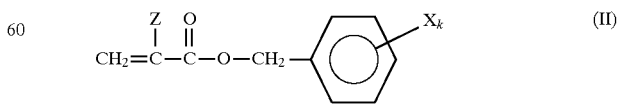

wherein X is a bromine atom, k is an integer of 1 to 5, and Z is a hydrogen atom or a methyl group,
and copolymers of these (meth)acrylates and one or more other vinyl monomers.

Illustrative examples of the compound represented by the general formula (II) include pentabromobenzyl acrylate, tetrabromobenzyl acrylate, tribromobenzyl acrylate, pentabromobenzyl methacrylate and the like.

Illustrative examples of the other vinyl monomers include acrylic esters such as acrylic acid, methyl acrylate, ethyl acrylate, butyl acrylate and benzyl acrylate; methacrylic esters such as methacrylic acid, methyl methacrylate, ethyl methacrylate, butyl methacrylate and benzyl methacrylate; unsaturated carboxylic acid and anhydrides thereof such as styrene, acrylonitrile, fumaric acid and maleic acid; vinyl acetate; vinyl chloride; and the like. They may generally be used in an equivalent molar amount or less with respect to brominated benzyl acrylate or brominated benzyl methacrylate, preferably 0.5 moles or less.

The polymerization degree of the brominated acrylic resin is not particularly limited, but preferably ranges from 10 to 100 from a view point of extrudability and flowability.

Brominated polystyrene, brominated polyphenylene ether, polycarbonate oligomers of brominated bisphenol A, brominated biphenyl ether and brominated diphthalimide compounds are known per se and conventional ones may be used.

The brominated flame retardant may be used preferably in an amount of 2 to 45 parts by weight, more preferably 15 to 40 parts by weight, based on 100 parts by weight of the total of the aromatic polyester resin (A) and the polyester block copolymer resin (B).

When it is used in combination with a reinforcing filler, it may be used preferably in an amount of 2 to 50 parts by weight, more preferably 15 to 40 parts by weight, based on the same standard above.

When the polyester resin composition of the present invention contains a brominated flame retardant, an antimony-containing flame retardant auxiliary is preferably used.

Illustrative examples of the antimony-containing flame retardant auxiliary include antimony trioxide, antimony tetroxide, antimony pentoxide represented by (NaO). $(Sb_2O_5) \cdot qH_2O$ (p=0~1, q=0~4) or sodium antimonate. The particle diameter of the antimony-containing flame retardant auxiliary is not particularly limited, but preferably ranges from 0.02 to 5 $\mu$m.

This antimony-containing flame retardant auxiliary has a great effect on the decomposition of organic compounds such as an aromatic polyester and/or bromine-containing flame retardant and/or a release agent. To suppress the decomposition of the aromatic polyester resin composition and metal corrosion by the resulting decomposition product, it is preferred to use at least one of (1) antimony trioxide showing a pH of 3 to 5 in an ethanol solution, (2) antimony pentoxide showing a pH of 3 to 6 in an ethanol solution, and (3) partial sodium salt of antimony pentoxide having a pH of 6 to 9 in an ethanol solution. Particularly, (3) antimony pentoxide is preferred. The term "pH in an ethanol solution" as used herein refers to a value obtained when a supernatant prepared by adding 1 g of a sample to 50 ml of ethanol, decomposing and dissolving the sample in the solution is measured by a hydrogen ion concentration meter at room temperature.

The antimony-containing flame retardant auxiliary may be surface treated with an epoxy compound, silane compound, isocyanate compound, titanate compound or the like as required.

The antimony-containing flame retardant auxiliary is used preferably in an amount of 1 to 25 parts by weight, more preferably 5 to 20 parts by weight, based on 100 parts by weight of the total of the aromatic polyester resin (A) and the polyester block copolymer resin (B).

When the polyester resin composition contains a reinforcing filler, the antimony-containing flame retardant auxiliary is used preferably in an amount of 1 to 30 parts by weight, more preferably 5 to 20 parts by weight, based on the same standard above.

Within the above range, the antimony-containing flame retardant auxiliary is particularly preferably used in such a proportion that the number of antimony metal atoms is 1 with respect to 2 to 5 bromine atoms in the brominated flame retardant.

Moreover, the resin composition of the present invention may be blended with a compound for suppressing dropping of molten particles at the time of combustion in order to further enhance a flame retardant effect of the brominated flame retardant and the antimony-containing flame retardant auxiliary. As the compound which exerts such an effect, polytetrafluoroethylene and fumed colloidal silica which are produced by emulsion polymerization and suspension polymerization are known.

The resin composition of the present invention may be blended with a pigment or other compounding agent, as required. Specific examples of the compounding agent include fillers other than fibrous and flaky fillers, that is, powdery or granular inorganic fillers such as kaolin, clay, wollastonite, talc, mica, calcium carbonate, calcium sulfate, silicon carbide, silicon nitride, magnesium oxide, zinc carbonate, alumina, titanium oxide, barium carbonate, barium sulfate, molybdenum disulfide, iron oxide, zinc oxide, zircon oxide, barium titanate, lead oxide, glass beads and glass flakes.

The filler is generally blended as a reinforcement or surface modifier or for the purpose of modifying electric and thermal characteristics, but should be blended in the minimum amount that allows it to exert its effect and as far as it does not lose excellent characteristics of the composition and advantages in molding by blending an excess amount.

For the purpose of improving heat resistance, an antioxidant or heat stabilizer such as a hindered phenolic compound, aromatic amine compound, organic phosphoric compound and sulfuric compound may be added. In this case, a hindered phenolic compound having a molecular weight of 1,000 or more is preferred to retain low metal corrosiveness. Various epoxy compounds may also be added to improve melt viscosity stability and resistance to hydrolysis. Preferred examples of the epoxy compounds include bisphenol A epoxy compounds obtained by reacting bisphenol A with epichlorohydrin, aliphatic glycidyl ethers obtained by reacting glycols and glycerol with epichlorohydrin, novolak epoxy compounds, aromatic or aliphatic carboxylic acid type epoxy compound, alicyclic compound type epoxy compounds and the like.

A stabilizer, coloring agent, lubricant, ultraviolet light absorbent and antistatic agent may be added.

Further, other thermoplastic resins such as other polyester resins, polyamide resins, polyphenylene sulfide resins, polyphenylene ether resins, polycarbonate resins, phenoxy resins, polyethylene and copolymers thereof, polypropylene and copolymers thereof, polystyrene and copolymers thereof, acrylic resins and acrylic copolymers, and polyamide elastomers; and thermosetting resins such as phenolic resins, melamine resins, unsaturated polyester resins and silicone resins may be blended in small amounts.

It is preferred that the polyester resin composition of the present invention further contain an alkali metal salt, phosphonic acid and/or phosphonic monoester, at least one compound selected from phosphates, or hydrous basic carbonate compound of magnesium and aluminium when the aromatic polyester is a polyester typified by polytetramethylene terephthalate which contains tetramethylene glycol as a glycol component. Inclusion of these compounds markedly suppresses the decomposition of the polyester resin composition and, hence, further reduces metal corrosiveness of relay contacts and the like made of the polyester resin composition, thereby making it possible to further enhance the reliability of a relay.

"An alkali metal salt" as described above refers to hydroxides, inorganic acid salts, organic acid salts, complex salts and ammonium salts of Groups Ia (alkali metals) and IIa (alkali earth metals) of the Periodic Table. They can be used alone or in combination of two or more.

Illustrative examples of the alkali metal salt include lithium hydroxide, sodium hydroxide, potassium hydroxide, rubidium hydroxide, cesium hydroxide, francium hydroxide, beryllium hydroxide, magnesium hydroxide, strontium hydroxide, barium hydroxide, lithium acetate, sodium acetate, potassium acetate, magnesium acetate, calcium acetate, lithium carbonate, sodium carbonate, potassium carbonate, lithium benzoate, sodium benzoate, potassium benzoate and the like.

Illustrative examples of the phosphonic acid and/or the phosphonic monoester include alkyl phosphonate, phenyl phosphonate, monoalkyl phosphonate, monophenyl phosphonate and the like. Further, examples of the phosphates include sodium monohydrogen phosphate, sodium dihydrogen phosphate, potassium phosphate, potassium dihydrogen phosphate and the like.

Inclusion of the alkali metal salt and the phosphonic acid and/or the phosphonic monoester suppresses the decomposition of the aromatic polyester and provides an effect of controlling generation of tetrahydrofuran as its main decomposition product. As for the amounts of these substances to be blended, the alkali metal salt and the phosphonic acid and/or its ester are blended in amounts of 0.001 to 1% by weight and 0.03 to 0.3% by weight based on the total weight of the composition, respectively. If these amounts are below respective lower limits, the effect of controlling generation of tetrahydrofuran provided by blending will be unsatisfactory, whereas, if the amounts are above respective upper limits, problems including a reduction in the molecular weight of the aromatic polyester will inadvantageously occur at the time of extrusion and molding.

Since the phosphonic acid and/or the phosphonic monoester have or has a function to suppress ester exchange reaction because an OH group is located on a titanium-based catalyst used as a catalyst for the polymerization of the aromatic polyester and the polyester block copolymer, they or it may be used as a polymerization reaction stopper. Thereby, the phosphonic acid and/or the phosphonic monoester may be blended when the components are kneaded by an extruder, or during polymerization when a titanium-based catalyst is used for the polymerization of the aromatic polyester and the polyester block copolymer, or in both cases. However, it is preferred to blend these substances at the time of kneading by an extruder as well because they are blended in the minimum amounts enough to act on the titanium-based catalyst at the time of polymerization reaction.

Moreover, the hydrous basic carbonate compound of magnesium and aluminum is a hydrotalcite represented by the following formula (III):

$$Mg_{1-x}Al_x(OH)_2(CO_3)_{x/2} \cdot mH_2O \qquad (III)$$

wherein x is a number of 0.2 to 0.4 and m is a positive number.

The compound is divided into a natural compound and a synthetic compound, both of which may be used in the present invention. However, the preferred is the one shows a pH of 7 to 10 in an ethanol solution.

When the hydrous basic carbonate compound of magnesium and aluminum is blended, it adsorbs hydrobromic acid and other acid compounds generated by the decomposition of the brominated flame retardant due to its ion exchange capability and suppresses the decomposition of the aromatic polyester and brominated flame retardant, thereby controlling generation of various metal corrosive gases. If the compound has a pH value outside the above-mentioned range, it does not fully provide the effect of suppressing the decomposition.

The compound is blended in an amount of 0.1 to 5% by weight based on the total weight of the composition. If the amount is beyond this range or below this range, the effect of suppressing generation of metal corrosive gases is not fully provided.

Preferably, various blend components as described above are uniformly dispersed in the resin composition of the present invention and a conventional method may be used to blend these components. For example, part or all of the blend components are fed to a heated monoaxial or biaxial extruder in the lump or separately and melt kneaded to achieve uniform quality. The molten resins extruded into strand forms are cooled to be solidified and then cut into desired lengths, made granular and uniformly blended. Or, they may be uniformly blended by using other mixer such as a blender, kneader, roll and the like. These methods may be combined or each method may be repeated several times to add the blend components one after another.

To obtain a resin molding from the thus obtained resin composition for molding, the resin composition is generally fed to a molding machine such as an injection molding machine to be molded while it is kept fully dry. Further, the constituent materials of the composition may be dry blended and directly charged into a hopper of a molding machine to be melt kneaded in the molding machine.

Preferred resin molded articles include relay components such as a relay case, relay body, relay coil bobbin and relay card.

The following examples are provided to further illustrate the present invention. Measurement values in the examples are obtained by the following methods.

Noise suppression property evaluation method: A relay case of 0.5 mm in thickness was produced by an injection molding machine, mounted on the DS2-M relay manufactured by Matsushita Electric Works, Ltd. and sealed with an epoxy adhesive. The relay case has the same shape as the DS2-M. An AC voltage of 5 V, 50 Hz was applied to the terminal of this relay to open and close the relay periodically so that a sound pressure generated was measured with the NA-41 noise meter manufactured by Ryon K. K. Noise measurement was based on an average level for 10 seconds in accordance with JIS-C1502, A characteristics.

Waveform recording method: Sound was generated by a similar method to the noise suppression property evaluation method and picked up by a microphone. Signals from the microphone were amplified by a noise meter (NA-41) so that AC waveform signals were taken out from the external analog output terminal of the noise meter and converted into digital signals by a microcomputer to be recorded on a recorder.

Tan δ: Measured using the DMA2001 thermal analyzer manufactured by Du Pont de Numours & Co. in a resonance mode. A resonance frequency lower than 20 Hz was used as a measurement frequency.

Flexural modulus: Measured in accordance with ASTM D790.
Mechanical properties: A tensile test and an impact test were conducted in accordance with ASTM D638 and ASTM D256 (Izod, notched), respectively.
Deflection temperature under load: In accordance with ASTM D648.
Combustibility: Evaluated by a method (UL94) specified by Underwriter Laboratory of the US (test sample thickness of 1.6 mm).
Intrinsic viscosity: Measured at 35° C. with an Ostwald viscosity tube using o-chlorophenol as a solvent.
Gases generated by decomposition: log of a pulverized flaky molding of a polytetramethylene terephthalate (abbreviated as PBT hereinafter) resin composition, provided by the invention, of 0.32 mm in thickness which was molded at a cylinder temperature of 270° C. and a mold temperature of 60° C. was placed in a head space (27 ml), and then the head space was sealed and heated at 150° C. for 60 minutes. Generated gases were analyzed by gas chromatography and the content of tetrahydrofuran (THF) was measured.
Bromine content: 5.0 g of a pellet sample of the resin composition was placed in a 20 ml vial bottle heated at 200° C. by an aging tester and heated at 300° C. for 1 hour. Thereafter, the pellet sample was left at room temperature for 1 hour and 5 ml of ion exchange water was added to the pellet sample and stirred for 10 minutes. The bromine content of this extracted water was quantitatively determined by ion chromatography.
Metal corrosiveness: 200 g of fully dried pellets of a PBT resin composition of the invention and a silver plate (15× 20×0.2 mm) were placed in a glass container and the container was sealed and heated at 200° C. for 150 hours. Color change of the silver plate was observed.

EXAMPLES 1 TO 7 AND COMPARATIVE EXAMPLES 1 TO 7

(1) The following resins 1 to 8 were prepared.
Resin 1 polytetramethylene terephthalate (C7000N manufactured by Teijin Ltd.) This resin had a flexural modulus of 2,700 MPa.
Resin 2 175 parts by weight (to be simply referred to as "parts" hereinafter) of dimethyl isophthalate, 23 parts of dimethyl sebacate, and 140 parts of hexamethylene glycol were subjected to ester exchange reaction in the presence of a dibutyltin diacetate catalyst and polycondensation was carried out at a reduced pressure to obtain an amorphous polyester having an intrinsic viscosity of 1.06 and no heat absorption peak attributed to molten crystals by the DSC process. To this polyester was added 107 parts of polybutylene terephthalate dry chips having an intrinsic viscosity of 0.98 which were prepared by polycondensation separately so as to carry out a block copolymerization reaction at 240° C. for 45 minutes. Thereafter, 0.1 part of phenyl phosphonate was added to stop the reaction. This block polyester was taken out and formed into a chip for use as a source material. This chip had a melting point of 190° C., an intrinsic viscosity of 1.03, a tan δ peak at 16° C., a rebound resilience rate at 20° C. of 12% and a flexural modulus of 240 MPa.
Resin 3 125 parts of dimethyl isophthalate, 54 parts of dimethyl sebacate and 140 parts of hexamethylene glycol were subjected to ester exchange reaction in the presence of a dibutyltin diacetate catalyst and polycondensation was carried out at a reduced pressure to obtain a polyester having an intrinsic viscosity of 1.06. This polyester was block polymerized with polybutylene terephthalate having an intrinsic viscosity of 0.98 and then formed into a chip like Resin 2. The thus obtained chip had a tan δ peak at −8° C. and a rebound resilience rate at 20° C. of 46%.
Resin 4 This is a polyester ether elastomer which comprises polytetramethylene terephthalate as a hard segment and 62 wt % of polytetramethylene glycol having a molecular weight of 1,000 as a soft segment. Its tan δ peak was not observed at temperatures above −20° C. Its tan δ at room temperature (20° C.) was 0.02.
Resin 5 polyacetal (Delrin N100 manufactured by Du Pont de Numours & Co.)
It had a flexural modulus of 1900 MPa and a tan δ at room temperature of 0.02.
Resin 6 A styrene-ethylene/butylene-styrene block copolymer) (SEBS)resin (Klayton G1650 manufactured by Shell Chemical Corporation
Its tan δ peak was nonexistent at temperatures above −20° C. Its tan δ at room temperature was 0.01 or less.
Resin 7 A PBT resin was blended with 40 wt % of barium titanate to increase specific gravity to 3.1 g/cm$^3$ in order to improve its sound suppression effect.
Resin 8 Polyethersulfone (PES) resin (Radel R-7000 manufactured by Teijin Amoco Engineering Plastics Ltd.)
(2) Various resin compositions were prepared by combining the resins 1 to 8 prepared above, a glass fiber reinforcement and mica. These compositions are shown in Table 1 (Examples 1 to 7) and Table 2 (Comparative Examples 1 to 7). Test samples were molded by an injection molding machine at a cylinder temperature of 230° C. and a mold temperature of 40° C. to make various evaluations.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| Resin 1 (wt %) | 72 | 40 | 36 | 64 | 30 | 90 | 80 |
| Resin 2 (wt %) | 8 | 40 | 24 | — | — | 10 | 20 |
| Resin 3 (wt %) | — | — | — | 16 | 20 | — | — |
| Glass fiber reinforcement (wt %) | 20 | 20 | 10 | 20 | 50 | — | — |
| Mica (wt %) | — | — | 30 | — | — | — | — |
| Flexural modulus (MPa) | 5400 | 3500 | 3700 | 4900 | 9400 | 2100 | 1600 |
| Average noise level (dB) | 87.9 | 84.5 | 84.2 | 86.5 | 85.7 | 87.8 | 86.2 |
| Loss (tanδ) at 20° C. | 0.09 | 0.16 | 0.14 | 0.12 | 0.09 | 0.08 | 0.10 |

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
| Resin 1 (wt %) | 70 | 100 | 64 | 64 | — | — | — |
| Resin 2 (wt %) | — | — | — | — | 16 | 30 | — |
| Resin 4 (wt %) | — | — | 16 | — | — | — | — |
| Resin 5 (wt %) | — | — | — | — | 64 | — | — |
| Resin 6 (wt %) | — | — | — | 16 | — | — | — |
| Resin 7 (wt %) | — | — | — | — | — | — | 100 |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Resin 8 (wt %) | — | — | — | — | — | 70 | — |
| Glass fiber reinforcement (wt %) | 30 | — | 20 | 20 | 20 | — | — |
| Flexural modulus (MPa) | 8800 | 2300 | 3300 | 2800 | 1200 | 2100 | 2600 |
| Average noise level (dB) | 90.4 | 88.5 | 87.3 | 86.5 | 84.8 | 88.3 | 89.7 |
| Loss (tan δ) at 20° C. | 0.01 | 0.03 | 0.04 | 0.04 | 0.06 | 0.02 | 0.02 |

Figure 2:
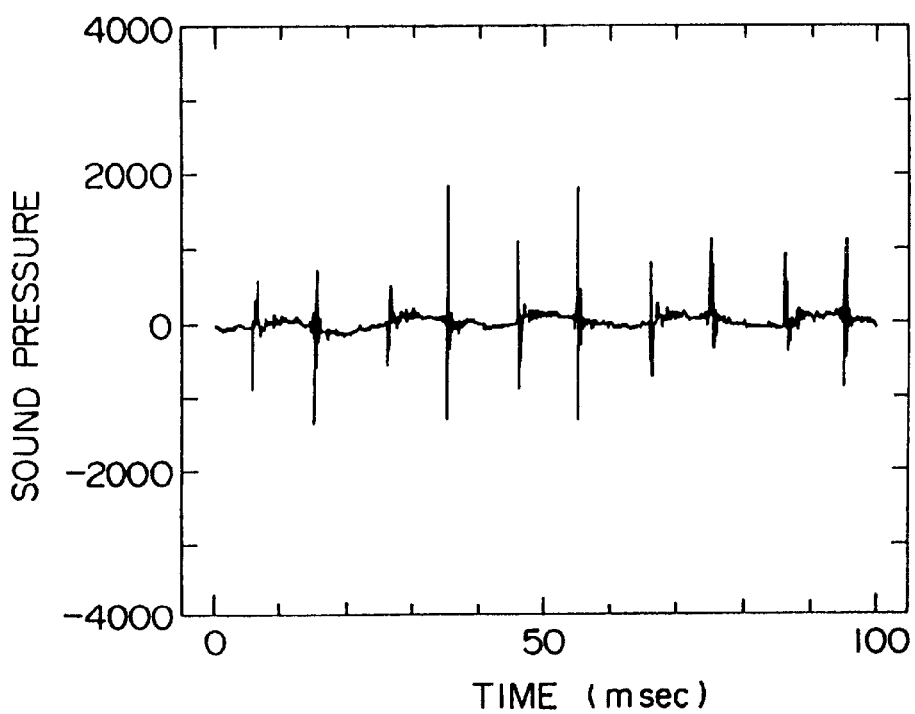
FIG. 2 is a graphic illustration of the waveform of generated sound recorded to evaluate the noise suppression property of a relay case of Example 2.
Figure 3:
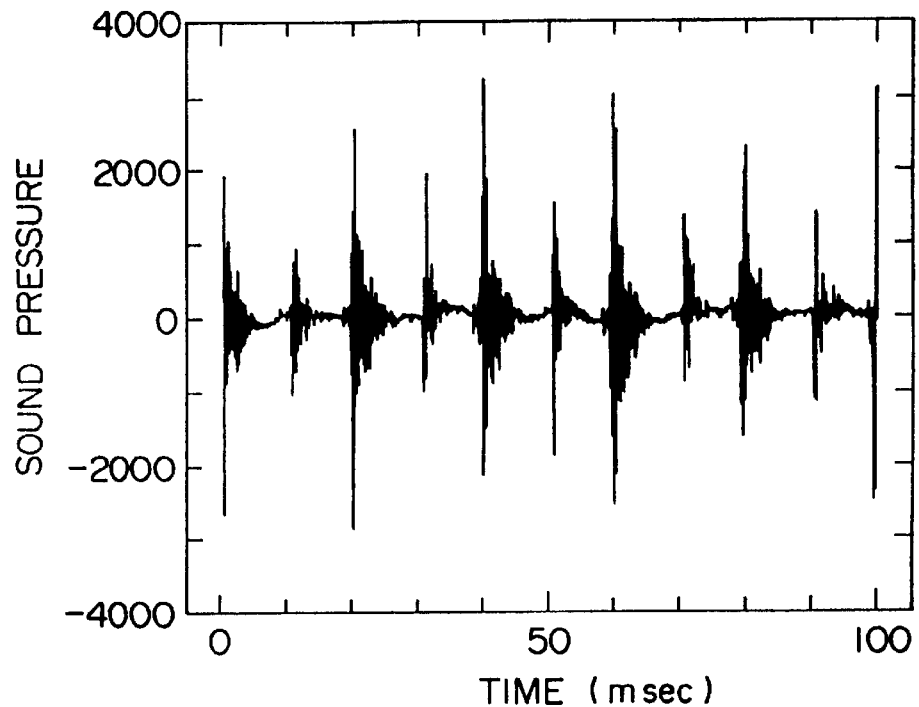
FIG. 3 is a graphic illustration of the waveform of generated sound recorded to evaluate the noise suppression property of a relay case of comparative Example 1.
Figure 4:
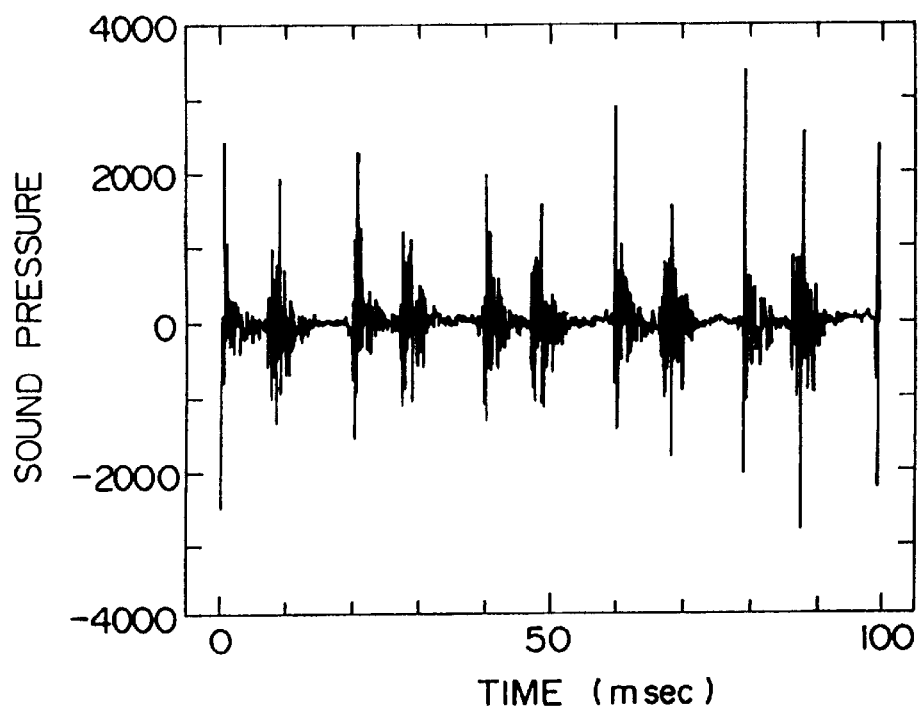
FIG. 4 is a graphic illustration of the waveform of generated sound recorded to evaluate the noise suppression property of a relay case of comparative Example 6.

FIGS. 1 to 4 show the waveforms of generated sounds which were recorded to evaluate the noise suppression property of a relay case. The axis of ordinates indicates a sound pressure and the axis of abscissas indicates an elapsed time (msec). FIG. 1 shows Example 1, FIG. 2 shows Example 2, FIG. 3 shows Comparative Example 1 and FIG. 4 shows Comparative Example 6.

In FIG. 3 (Comparative Example 1) and FIG. 4 (Comparative Example 6), amplitude is large and maintained for a prolonged time. It is assumed from this fact that a large resonance sound (reverberation sound) is generated.

On the other hand, in FIG. 1 (Example 1) and FIG. 2 (Example 2), the maximum value of amplitude is small and a reverberation time is considerably short. It can be visually understood that the resin composition of the present invention has a function to reduce the maximum value (peak) and duration of sound, thereby making it possible to clearly determine that noise generated from a relay is effectively suppressed.

EXAMPLES 8 TO 22 AND COMPARATIVE EXAMPLES 8 AND 9

A PBT resin having an intrinsic viscosity of 0.88 which was dried with hot air at 130° C. for 8 hours (manufactured by Teijin Ltd.), resin 2 and resin 3 used in Examples 1 to 7, the below-described resin 9, flame retardant 1 (brominated bisphenol A epoxy resin, EP-100 manufactured by Dainippon Ink and Chemicals, Inc.) or flame retardant 2 (brominated acrylic resin, FR-1025 manufactured by Bromine Compounds Ltd.), flame retardant auxiliary 1 (antimony trioxide which shows a pH of 3.9 in an ethanol solution, PATOX-C manufactured by Nihon Seiko K. K.) or flame retardant auxiliary 2 (sodium antimonate which shows a pH of 8.5 in ethanol 11, Sun Epoch NA1030 manufactured by Nissan Chemical Industries, Ltd.) as an antimony-containing flame retardant auxiliary, a glass fiber chopped strand having a fiber diameter of 10.5 μm and a length of 3 mm (manufactured by Nippon Electric Glass Co., Ltd), potassium acetate, phenyl phosphonate (the amount in Table 3 is the amount which was blended at the time of extrusion and does not include phenyl phosphonate contained in resin 2 and resin 3), hydrotalcite which shows a pH of 9.0 in an ethanol solution (DHT-4A.2 manufactured by Kyowa Chemical Industry Co, Ltd.), and PTFE powders for improving combustibility (Fluon CD076 manufactured by Asahi-ICI Fluoropolymers Co., Ltd) were uniformly pre-mixed with a tumbler in proportions shown in Table 3, and melt kneaded at a cylinder temperature of 265° C., a screw revolution of 150 rpm and a discharge rate of 50 kg/hr while they were drawn into vacuum using a vented biaxial extruder having a screw diameter of 44 mm. Thread discharged from a dice were cooled and cut to obtain pellets for molding.

Thereafter, the pellets were molded into molded articles for measuring properties by an injection molding machine with an injection capacity of 5 ounce at a cylinder temperature of 260° C., a mold temperature of 60° C., an injection pressure of 60 MPa, a cooling time of 12 seconds and a molding cycle of 40 seconds.

The resin 9 was prepared as follows.

125 Parts of dimethyl isophthalate, 54 parts of dimethyl sebacate and 140 parts of hexamethylene glycol were subjected to ester exchange reaction in the presence of a dibutyltin diacetate catalyst and polycondensation was carried out at a reduced pressure to obtain a polyester having an intrinsic viscosity of 1.06. This polyester (40 parts) was block polymerized with 40 parts of polybutylene terephthalate having an intrinsic viscosity of 0.98 and then formed into a chip like Resin 2. The thus obtained chip had a tan δ peak at −4° C. and a rebound resilience rate at 20° C. of 46%.

These molded articles were measured for their properties. Results are shown in Table 4.

TABLE 3

| | Composition (wt %) | | | | | | | | | | | |
|---|---|---|---|---|---|---|---|---|---|---|---|---|
| | PBT resin | Resin 2 | Resin 3 | Flame retardant 1 | Flame retardant 2 | Flame retardant auxiliary 1 | Flame retardant auxiliary 2 | Glass fiber | Potassium acetate | Phenyl phosphonate | Hydrotalcite | PTFE powder |
| Comp. Ex. 8 | 59 | — | — | 14 | — | — | 7 | 20 | — | — | — | — |
| Example 8 | 47 | 12 | — | 14 | — | — | 7 | 20 | — | — | — | — |
| Example 9 | 41 | 18 | — | 14 | — | — | 7 | 20 | — | — | — | — |
| Example 10 | 35 | 24 | — | 14 | — | — | 7 | 20 | — | — | — | — |
| Comp. Ex. 9 | 51 | — | — | 13 | — | — | 6 | 30 | — | — | — | — |
| Example 11 | 41 | 10 | — | 13 | — | — | 6 | 30 | — | — | — | — |
| Example 12 | 36 | 15 | — | 13 | — | — | 6 | 30 | — | — | — | — |
| Example 13 | 31 | 10 | — | 13 | — | — | 6 | 30 | — | — | — | — |
| Example 14 | 41.49 | 14 | — | 15 | — | 6 | — | 30 | — | — | — | — |
| Example 15 | 41.49 | — | 18 | 17 | — | 8.5 | — | 15 | 0.01 | — | — | — |

TABLE 3-continued

| | Composition (wt %) | | | | | | | | | | | |
|---|---|---|---|---|---|---|---|---|---|---|---|---|
| | PBT resin | Resin 2 | Resin 3 | Flame retardant 1 | Flame retardant 2 | Flame retardant auxiliary 1 | Flame retardant auxiliary 2 | Glass fiber | Potassium acetate | Phenyl phosphonate | Hydro-talcite | PTFE powder |
| Example 16 | 34.99 | — | 14 | 15 | — | — | 6 | 30 | 0.01 | — | — | — |
| Example 17 | 34.59 | — | 14 | 15 | — | — | 6 | 30 | 0.01 | — | 0.4 | — |
| Example 18 | 36.70 | — | 20 | — | 9 | — | 4 | 30 | — | — | — | 0.3 |
| Example 19 | 36.68 | — | 20 | — | 9 | — | 4 | 30 | 0.02 | — | — | 0.3 |
| Example 20 | 36.58 | — | 20 | — | 9 | — | 4 | 30 | 0.02 | 0.1 | — | 0.3 |
| Example 21 | 20 | — | 29*[1] | 15 | — | — | 6 | 30 | — | — | — | — |
| Example 22 | 19.9 | — | 29*[1] | 15 | — | — | 6 | 30 | — | 0.1*[2] | — | — |

*[1]Resin 9 was used.
*[2]Sodium dihydroxide phosphate

TABLE 4

| | Characteristics of molding | | | | | | | |
|---|---|---|---|---|---|---|---|---|
| | Tensile strength (MPa) | Impact strength (J/m) | HDT (°C.) | Combustibility UL94 | Amount of THF gas generated (ppm) | Amount of bromine gas (ppm) | Metal corrosiveness | Relay sound insulation property (dB) |
| Comp. Ex. 8 | 128 | 64 | 199 | V-O | 90 | 930 | slightly change | 80.0 |
| Example 8 | 115 | 69 | 189 | V-O | 89 | 1010 | slightly change | 78.3 |
| Example 9 | 104 | 75 | 178 | V-O | 88 | 940 | slightly change | 75.3 |
| Example 10 | 93 | 91 | 156 | V-O | 88 | 960 | slightly change | 75.5 |
| Comp. Ex. 9 | 148 | 81 | 202 | V-O | 81 | 800 | slightly change | 81.6 |
| Example 11 | 136 | 82 | 198 | V-O | 78 | 800 | slightly change | 79.7 |
| Example 12 | 128 | 85 | 188 | V-O | 78 | 890 | slightly change | 77.9 |
| Example 13 | 118 | 90 | 169 | V-O | 75 | 860 | slightly change | 76.1 |
| Example 14 | 124 | 90 | 188 | V-O | 98 | 2300 | great change | 78.6 |
| Example 15 | 89 | 63 | 175 | V-O | 65 | 900 | slight change | 75.0 |
| Example 16 | 126 | 100 | 187 | V-O | 62 | 820 | slight change | 77.6 |
| Example 17 | 115 | 101 | 185 | V-O | 55 | 880 | trace change | 78.6 |
| Example 18 | 115 | 92 | 170 | V-O | 74 | 330 | slight change | 73.0 |
| Example 19 | 119 | 94 | 171 | V-O | 52 | 320 | slight change | 73.2 |
| Example 20 | 118 | 94 | 171 | V-O | 25 | 400 | slight change | 71.8 |
| Example 21 | 132 | 130 | 170 | V-O | 89 | 800 | slight change | 74.0 |
| Example 22 | 130 | 125 | 170 | V-O | 30 | 810 | slight change | 74.3 |

A PBT resin composition which is reinforced with a glass fiber and flame retarded with a flame retardant and a flame retardant auxiliary is excellent in mechanical properties such as tensile strength, impact strength and the like, heat resistance represented by HDT and the like, and non-flammability. However, the noise suppression property of a relay encased by a relay case molded from the PBT resin composition is insufficient (Comparative Examples 8 and 9). However, when the composition is blended with a block polyester (resin 1, resin 2), the noise suppression property of the relay case made of the composition is significantly improved while excellent mechanical properties, heat resistance and non-flammability of the PBT resin composition are retained (Examples 8 to 20).

Although the reliability of a relay product is greatly affected by the metal corrosiveness of gases generated from the resin composition, this metal corrosiveness is known not only by a method for determining the degree of metal corrosion (change of color) when a metal such as silver and the resin composition are sealed and heated, but also by the amount of bromine generated which is an index of the decomposition of a flame retardant and THF, a main component generated by the decomposition of the PBT polymer.

To suppress the amount of bromine generated, it is effective to use a brominated bisphenol A epoxy resin as flame retardant 1 and a brominated acrylic resin as flame retardant 2 (Examples 13 and 18), and also to use sodium antimonate as flame retardant auxiliary 2 (Examples 12 and 14).

The amount of THF generated is reduced by addition of potassium acetate and phenyl phosphonate (Examples 15, 16, 19 and 20).

Further, it was found that addition of hydrotalcite greatly suppresses metal corrosiveness (Example 17).

EXAMPLES 23 TO 25

Amounts shown in Table 5 of polybutylene terephthalate (intrinsic viscosity: 1.03), the polyester block copolymer used in Examples 1 to 7, and a glass fiber were melt kneaded at 250° C., using a 57 mm extruder. Results obtained are shown in Table 5. Molding was performed by an injection molding machine at a cylinder temperature of 230° C. and a mold temperature of 60° C.

COMPARATIVE EXAMPLES 10 AND 11

(1) 31 parts of dimethyl terephthalate, 23 parts of tetramethylene glycol and 65 parts of polytetramethylene glycol (average molecular weight: 1,500) were subjected to ester exchange reaction by a conventional method and polycondensation was carried out at a reduced pressure to obtain a polyester having an intrinsic viscosity of 1.47. The thus obtained polyester is called resin 10.

(2) Results obtained when the above resin 10 was used in place of resin 1 in Example 1 and when HA3000, modified polypropylene manufactured by Tonen Sekiyukagaku K.K., was used are shown in Table 5.

TABLE 5

|  | Aromatic polyester (wt %) | Block copolymer (wt %) | Glass fiber (wt %) | Thread cut | Flexural modulus (J/m) | Weld strength retention rate (%) | tan δ |
|---|---|---|---|---|---|---|---|
| Example 23 | PBT 66.5 | Resin 2 3.5 | 30 | none | 8300 | 35 | 0.06 |
| Example 24 | PBT 49 | Resin 2 21 | 30 | none | 6000 | 39 | 0.12 |
| Example 25 | PBT 38.5 | Resin 2 31.5 | 30 | none | 4500 | 42 | 0.15 |
| Comp. Example 10 | PBT 49 | Resin 10 21 | 30 | frequently | 6700 | 25 | 0.02 |
| Comp. Example 11 | PBT 49 | HA300 21 | 30 | 3 times/hr. | 4600 | 23 | 0.02 |

EXAMPLES 26 AND COMPARATIVE EXAMPLE 11

The procedure of Example 21 was repeated except that polybutylene terephthalate (intrinsic viscosity: 1.03) and resin 3 used in Example 1 or resin 10 were used and a glass fiber was not used. Results are shown in Table 6.

TABLE 6

|  | Aromatic polyester (wt %) | Block copolymer (wt %) | Thread cut | tan δ |
|---|---|---|---|---|
| Example 26 | PBT 60 | Resin 3 40 | none | 0.11 |
| Comp. Example 11 | PBT 60 | Resin 10 40 | frequently | <0.01 |

EXAMPLES 27 AND 28

The procedure of Example 21 was repeated except that polybutylene terephthalate (intrinsic viscosity: 0.75) or polyethylene terephthalate (intrinsic viscosity: 0.62) and resin 2 were used and a glass fiber was not used. Results are shown in Table 7.

TABLE 7

|  | Aromatic polyester (wt %) | Block copolymer (wt %) | Thread cut | tan δ |
|---|---|---|---|---|
| Example 27 | PBT 70 | Resin 2 30 | none | 0.12 |
| Example 28 | PET 60 | Resin 2 40 | none | 0.13 |

What is claimed is:

1. A polyester resin composition having excellent vibration-damping and noise suppression properties and rigidity consisting essentially of
   (A) an aromatic polyester resin wherein the aromatic polyester resin (A) consists essentially of a diol component which is an aliphatic glycol having 4 carbon atoms or cyclohexanedimethanol and a dicarboxylic acid component which is selected from the group consisting of benzenedicarboxylic acid and naphthalenedicarboxylic acid, and said aromatic polyester resin (A) having a flexural modulus of at least 1000 Mpa and an intrinsic viscosity of at least 0.50; and
   (B) a polyester block copolymer resin which consists essentially of
      (a) a polyester soft block consisting essentially of an aromatic dicarboxylic acid component and a diol component as main constituents wherein the polyester soft block (a) of the polyester block copolymer resin (B) contains aromatic dicarboxylic acid and aliphatic dicarboxylic acid and the proportion of the aromatic dicarboxylic acid of the polyester soft block (a) is at least 60 mol % of all the dicarboxylic acids and the aliphatic dicarboxylic acid is 40 mol % or less of all the dicarboxylic acids, and wherein the aromatic dicarboxylic acid soft block (a) of the polyester block copolymer resin (B) is selected from the group consisting of benzenedicarboxylic acid and naphthalenedicarboxylic acid, and having a melting point of about 100° C. or less or being amorphous and the diol component is an aliphatic glycol having 5 to 12 carbon atoms, and
      (b) a polyester hard block consisting essentially of a diol component which is an aliphatic glycol having 2 to 4 carbon atoms or cyclohexanedimethanol and a dicarboxylic acid component selected from the group consisting of benzenedicarboxylic acid and naphthalenedicarboxylic acid and having a melting point of about 150° C. or more,
   the proportion of the aromatic polyester resin (A) being 20 to 90% by weight based on the total weight of the aromatic polyester resin (A) and the polyester block copolymer resin (B).

2. The polyester resin composition of claim 1, wherein the glycol having 5 to 12 carbon atoms is at least one selected from the group consisting of hexamethylene glycol, decamethylene glycol, 3-methylpentamethylene glycol and 2-methyloctamethylene glycol.

3. The polyester resin composition of claim 1, wherein the polyester block copolymer resin (B) has the maximum value of dynamic loss tangent at a temperature between −20° C. and +40° C. of at least 0.05.

4. The polyester resin composition of claim 1 which contains a reinforcing filler in an amount of 0.1 to 100 parts by weight based on 100 parts by weight of the total of the aromatic polyester resin (A) and the polyester block copolymer resin (B).

5. The polyester resin composition of claim 4, wherein the reinforcing filler is fibrous or flaky.

6. The polyester resin composition of claim 1 which contains a brominated flame retardant in an amount of 2 to 45 parts by weight based on 100 parts by weight of the total of the aromatic polyester resin (A) and the polyester block copolymer resin (B).

7. The polyester resin composition of claim 6 which contains an antimony-containing flame retardant auxiliary compound in an amount of 1 to 25 by weight based on 100 parts by weight of the total of the aromatic polyester resin (A) and the polyester block copolymer resin (B).

8. The polyester resin composition of claim 1 wherein the aromatic polyester resin (A) dicarboxylic acid consists essentially of naphthalenedicarboxylic acid and the polyester block copolymer resin (B) soft block (a) dicarboxylic acid consists essentially of naphthalenedicarboxylic acid and the hard block (b) dicarboxylic acid consists essentially of naphthalenedicarboxylic acid.

9. A relay component formed of the polyester resin composition of claim 1.

10. A polyester resin composition having excellent vibration-damping and noise suppression properties and rigidity consisting essentially of
(A) an aromatic polyester resin consisting essentially of an aromatic dicarboxylic acid component selected from the group consisting of benzenedicarboxylic acid, naphthalenedicarboxylic and 4,4'diphenyldicarboxylic acid, and a diol component which is an aliphatic glycol having 4 carbon atoms or cyclohexanedimethanol, and said aromatic polyester resin (A) having a flexural modulus of at least 1000 Mpa and an intrinsic viscosity of at least 0.70; and
(B) an aromatic polyester block copolymer resin which consists essentially of (a) a polyester soft block consisting essentially of an aromatic dicarboxylic acid component selected from the group consisting of benzenedicarboxylic acid and naphthalenedicarboxylic acid, and a diol component which is an aliphatic glycol having 5 to 12 carbon atoms, wherein the polyester soft block (a) of the polyester block copolymer resin (B) contains aromatic dicarboxylic acid and aliphatic dicarboxylic acid and the proportion of the aromatic dicarboxylic acid of the polyester soft block (a) is at least 60 mol % of all the dicarboxylic acids and the aliphatic dicarboxylic acid is 40 mol % or less of all the dicarboxylic acids, and said polyester soft block having a melting point of 100° C. or less or being amorphous, and
(b) a polyester hard block consisting essentially of an aromatic dicarboxylic acid component selected from the group consisting of benzenedicarboxylic acid, naphthalenedicarboxylic acid and 4,4'-diphenyldicarboxylic acid, and a diol component which is an aliphatic glycol having 4 carbon atoms or cyclohexanedimethanol, and said polyester hard block having a melting point of 150° C. or more,
wherein the weight ratio of the polyester soft block to the polyester hard block is 30/70 to 80/20 and the polyester block copolymer (B) has an intrinsic viscosity of at least 0.50, and
wherein the polyester resin composition contains 20 to 90 parts by weight of the aromatic polyester (A) based on the total weight of aromatic polyester (A) and polyester block copolymer (B).

11. The polyester resin composition of claim 10, wherein the polyester block copolymer resin (B) has the maximum value of dynamic loss tangent at a temperature between −20° C. and +40° C. of at least 0.05.

12. The polyester resin composition of claim 10 which contains a reinforcing filler in an amount of 0.1 to 100 parts by weight based on 100 parts by weight of the total of the aromatic polyester resin (A) and the polyester block copolymer resin (B).

13. The polyester resin composition of claim 10 wherein the aromatic polyester resin (A) dicarboxylic acid consists essentially of naphthalenedicarboxylic acid and the polyester block copolymer resin (B) soft block (a) dicarboxylic acid consists essentially of naphthalenedicarobxylic acid and the hard block (b) dicarboxylic acid consists essentially of naphthalenedicarboxylic acid.

14. A polyester resin composition having excellent vibration-damping and noise suppression properties and rigidity consisting essentially of
(A) an aromatic polyester resin consisting essentially of an aromatic dicarboxylic acid component selected from the group consisting of terephthalic acid and 2,6-naphthalenedicarboxylic acid, and a diol component which is an aliphatic glycol having 4 carbon atoms or cyclohexanedimethanol, and said aromatic polyester resin (A) having a flexural modulus of at least 1500 Mpa and an intrinsic viscosity of 0.7 to 1.5 and
(B) an aromatic polyester block copolymer resin which consists essentially of
(a) a polyester soft block consisting essentially of an aromatic dicarboxylic acid component selected from the group consisting of terephthalic acid, isophthalic acid, phthalic acid and 2,6-naphthalenedicarboxylic acid, and a diol component which is an aliphatic glycol selected from the group consisting of hexamethylene glycol, decamethylene glycol, 3-methylpentamethylene glycol, 2-methyloctamethylene glycol, wherein the polyester soft block (a) of the polyester block copolymer resin (B) contains aromatic dicarboxylic acid and aliphatic dicarboxylic acid and the proportion of the aromatic dicarboxylic acid of the polyester soft block (a) is at least 60 mol % of all the dicarboxylic acids and the aliphatic dicarboxylic acid is 40 mol % or less of all the dicarboxylic acids and said polyester soft block having a melting point of 50° C. or less or being amorphous, and
(b) a polyester hard block consisting essentially of an aromatic dicarboxylic acid component selected from the group consisting of terephthalic acid and 2,6-naphthalenedicarboxylate acid, and a diol component which is an aliphatic glycol having 4 carbon atoms or cyclohexanedimethanol, and said polyester hard block having a melting point of 150° C. or more,
wherein the weight ratio of the polyester soft block to the polyester hard block is 50/50 to 80/20 and the polyester block copolymer (B) has an intrinsic viscosity of at least 0.8, and
wherein the polyester resin composition contains 20 to 90 parts by weight of the aromatic polyester (A) based on total weight of aromatic polyester (A) and polyester block copolymer (B).

15. The polyester resin composition of claim 14, wherein the polyester block copolymer resin (B) has the maximum value of dynamic loss tangent at a temperature between −20° C. and +40° C. of at least 0.05.

16. The polyester resin composition of claim 14 wherein the aromatic polyester resin (A) dicarboxylic acid consists essentially of 2,6-naphthalenedicarboxylic acid and the polyester block copolymer resin (B) soft block (a) dicarboxylic acid consists essentially of 2,6-naphthalenedicarboxylic acid and the hard block (b) dicarboxylic acid consists essentially of 2,6-naphthalenedicarboxylic acid.

17. A relay component formed of the polyester resin composition of claim 14.

18. A polyester resin composition having excellent vibration-damping and noise suppression properties and rigidity consisting essentially of (A) an aromatic polyester resin wherein the aromatic polyester resin (A) consists essentially of a diol component which is tetramethylene glycol or cyclohexanedimethanol and a dicarboxylic acid component which is selected from the group consisting of benzenedicarboxylic acid and naphthalenedicarboxylic acid, and said aromatic polyester resin (A) having a flexural modulus of at least 1000 Mpa and an intrinsic viscosity of at least 0.50; and (B) a polyester block copolymer resin which consists essentially of (a) a polyester soft block consisting essentially of a dicarboxylic acid component and a diol component wherein the dicarboxylic acid component consists of at least 60 mol % based on all the dicarboxylic acid components of an aromatic dicarboxylic acid component and 40 mol % or less based on all the dicarboxylic acid components of an aliphatic dicarboxylic acid component, the aromatic dicarboxylic acid component of the soft block (a) of the polyester block copolymer resin (B) is selected from the group consisting of benzenedicarboxylic acid and naphthalenedicarboxylic acid and the diol component is aliphatic glycol having 5 to 12 carbon atoms, said polyester soft block having a melting point of about 100° C. or less or being amorphous, and (b) a polyester hard block which consists essentially of a diol component which is tetramethylene glycol or cyclohexanedimethanol and a dicarboxylic acid component which is selected from the group consisting of benzenedicarboxylic acid and naphthalenedicarboxylic acid, said polyester hard block (b) having a melting point of about 150° C. or more, and wherein said polyester block copolymer resin (B) has the maximum value of dynamic loss tangent at a temperature between −20° C. and +40° C. of at least 0.05, and the proportion of the aromatic polyester resin (A) being 20 to 90% by weight based on the total weight of the aromatic polyester resin (A) and the polyester block copolymer resin (B).

19. The polyester resin composition of claim 18 wherein the aromatic polyester resin (A) dicarboxylic acid consists essentially of 2,6-naphthalenedicarboxylic acid and the polyester block copolymer resin (B) soft block (a) dicarboxylic acid consists essentially of 2,6-naphthalenedicarboxylic acid and the hard block (b) dicarboxylic acid consists essentially of 2,6-naphthalenedicarboxylic acid.

* * * * *